United States Patent [19]

Marshall

[11] Patent Number: 4,843,697
[45] Date of Patent: Jul. 4, 1989

[54] METHOD OF ASSEMBLING COMPONENTS

[75] Inventor: Robert A. Marshall, Ilford, United Kingdom

[73] Assignee: Ford Motor Company, Dearborn, Mich.

[21] Appl. No.: 118,686

[22] Filed: Nov. 9, 1987

[30] Foreign Application Priority Data

Nov. 14, 1986 [GB] United Kingdom ............... 8627244

[51] Int. Cl.⁴ .................. B23P 15/10; B23P 17/00
[52] U.S. Cl. .................. 29/156.5 A; 29/156.4 R; 29/424; 29/222
[58] Field of Search ............ 29/156.4 R, 156.4 WL, 29/458, 469, 424, 428, 222, 224, 156.5 A; 269/7

[56] References Cited

U.S. PATENT DOCUMENTS 2,387,971 10/1945 Aspin et al. ............... 29/156.4 WL
4,480,368 11/1984 Vachon .................... 29/156.4 WL
4,530,141 7/1985 Vachon .................... 29/428

Primary Examiner—Bruce Y. Arnold
Assistant Examiner—J. P. Ryan
Attorney, Agent, or Firm—Clifford L. Sadler; Jerome R. Drouillard

[57] ABSTRACT

The invention relates to a method of assembling two parts of which one part is a sub-assembly formed of a plurality of relatively movable components.

The method comprises the steps of holding the components of the sub-assembly in their desired relative positions for assembly, cooling the sub-assembly sufficiently to prevent relative movement between the components of the sub-assembly, and offering the sub-assembly to the other part while the components of the sub-assembly are locked against one another.

It is preferred to coat the sub-assembly prior to cooling with a liquid, the cooling being sufficient to freeze the liquid to cause locking of the components.

4 Claims, 1 Drawing Sheet

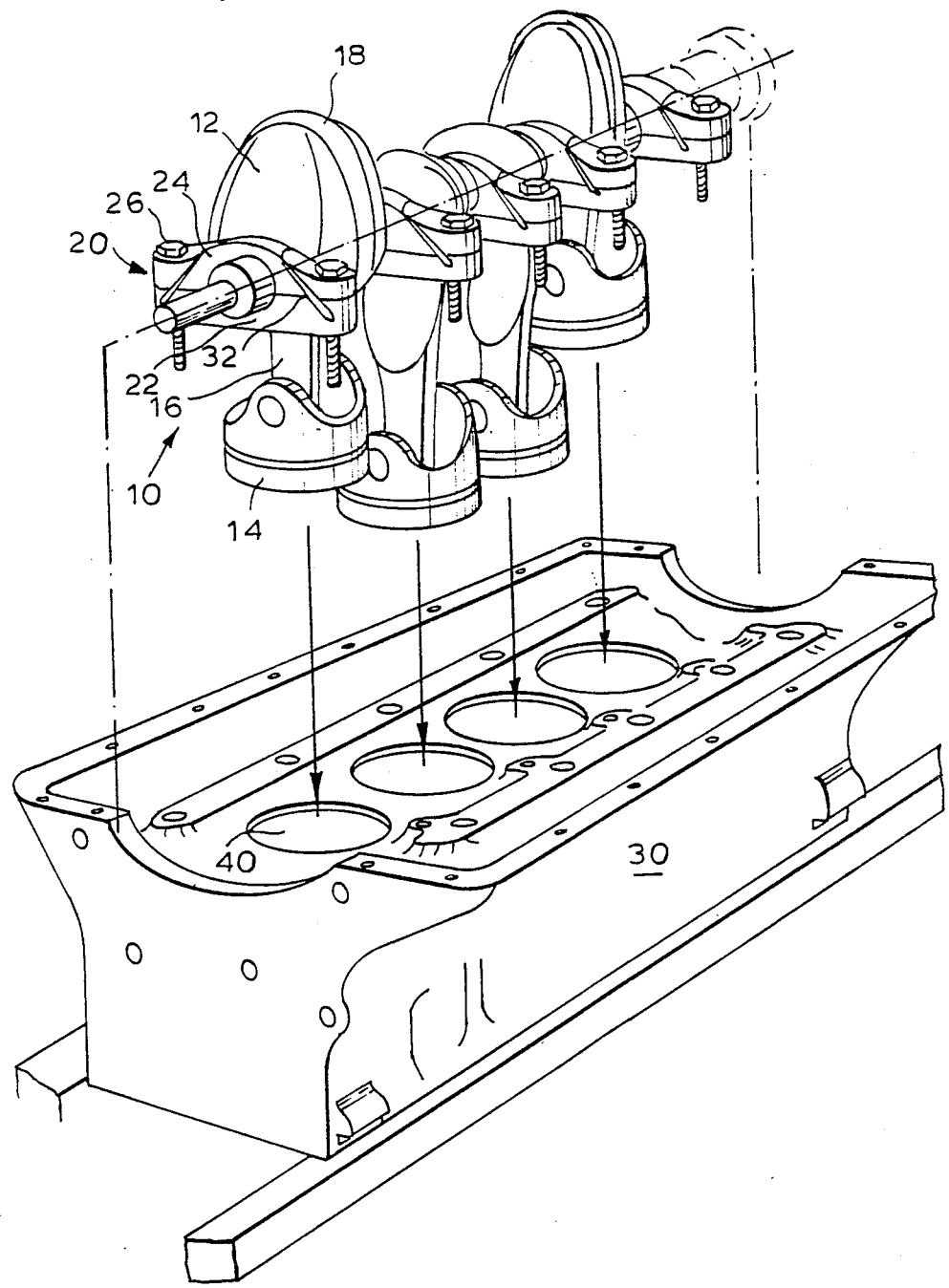

METHOD OF ASSEMBLING COMPONENTS

The present invention relates to the automated assembly of components.

Some engine parts present problems in automated assembly on account of the fact that one of the parts being assembled is itself a sub-assembly of components which are free to move relative to one another. One case where this problem is encountered is in fitting a piston and connecting rod assembly complete with piston rings into a cylinder bore. The rings are free to move and project from the piston, making it necessary for them to be compressed during insertion. Furthermore the piston can swivel on the connecting rod and this makes alignment awkward. However, alignment is necessary since the connecting rod must be used to drive the piston into the cylinder bore.

The current trend is to assemble a complete crankshaft for a cylinder block and to introduce all the pistons at the same time into their respective bores and here there is a still further degree of movement between the connecting rods and the crankshaft.

Another case where this problem is encountered is in fitting a rocker shaft complete with all the rockers onto a cylinder head. The rockers are again free to swivel and it is difficult for an automated process using robots to align all the rockers with their respective valves and push rods or cams prior to tightening the shaft mountings.

Other situations where this problem is encountered will be apparent from the examples given above but for purposes of illustration, the invention will be described only by reference to the assembly of a crankshaft in a cylinder block.

This case has been selected as it exemplifies a situation with a large number of relatively movable parts and it also demonstrates the difficulty presented by the fact that there is little space available for all the clamping devices that would be required to restrict the various degrees of freedom of the sub-assembly during its introduction into the cylinder block.

Because of these problems, it has hitherto been necessary for the sub-assembly of the crankshaft, connecting rods and pistons to be mounted manually into an engine block but this of course is costly and the invention seeks to provide a method of assembly which enables the mounting of such sub-assemblies to be automated.

According to the present invention, there is provided a method of assembling two parts of which one part is a sub-assembly formed of a plurality of relatively movable components, the method comprising the steps of holding the components of the sub-assembly in their desired relative positions for assembly, cooling the sub-assembly sufficiently to prevent relative movement between the components of the sub-assembly, and offering the sub-assembly to the other part while the components of the sub-assembly are locked against one another.

It is common in an engine for two of the relatively movable components of a sub-assembly to be formed of different metals or alloys of which the coefficients of thermal expansion differ. For example, the connecting rod may be made of aluminium and the gudgeon pin of steel with the result that freezing alone is sufficient to create an interference fit between the two components and prevent their relative movement during assembly.

However, though temperature change alone will work satisfactorily in some situations as outlined above, it cannot be applied where the difference in thermal expansion coefficients is not capable of creating the desired interference fit, either by virtue of the nature of the materials or in view of the clearance between the components. Even when freezing alone does suffice to lock the components, the temperature at which locking occurs will vary on account of manufacturing tolerances.

It is therefore preferred to coat the components with a liquid prior to cooling the sub-assembly and to cool the sub-assembly at least to the freezing point of the liquid.

Here, the liquid takes up any gaps arising from tolerances or otherwise and upon freezing locks the components firmly to one another. The freezing point is of course constant and the temperature at which the locking up of the components will occur does not vary with tolerances.

Some of the requirements which should be satisfied by the liquid are as follows:

1. the liquid should freeze at a safe temperature, and should not be a wax but relatively incompressible when solid,
2. the liquid should not be corrosive to the components as it may remain for a considerable time in contact with them,
3. the liquid should key into the surface of the components and form a high friction bond, and
4. the surface tension of the liquid should permit it to creep readily into gaps between the components.

Water and oil mixtures are particularly preferred for use as the liquid in the present invention as they are readily available, being often used as lubricants during machining of components. Furthermore, they satisfy the conditions set out above, they are inexpensive and do not present any form of hazard. However, other liquids may be used in at least some applications, for example vegetable oils.

If water is used in the liquid, then inhibitors are preferably added to prevent corrosion.

Water has the further advantage of expanding on freezing and this creates very considerable forces capable of holding even the piston rings compressed after they have been removed from the freezing rig.

The invention will now be described further, by way of example, with reference to the accompanying drawing which shows the mounting of a crankshaft sub-assembly into an engine block.

A crankshaft sub-assembly 10 in the drawing is to be introduced into an engine block 30. The crankshaft sub-assembly 10 comprises the crankshaft 12, the pistons 14 with their piston rings, the connecting rods 16, the big end bearings 18 and the main bearings 20. The main bearings are formed of a bearing housing 22, a bearing cap 24 and bearing shells (not shown) arranged between the crankshaft and the pillar block formed by the housing 22 and the cap 24.

The bolts 26 for tightening the main bearings are also used for securing the main bearings to the cylinder block 30 and therefore in the sub-assembly the main bearings are not tightened. To prevent their falling apart, the bearing housing is formed with a wire strap 32 which engages in a groove or over a ridge in the bearing cap 24 to hold the two together temporarily during the assembly procedure.

It should be mentioned that in a conventional engine, the bearing housing 22 is formed integrally with the engine block 30. However, the separation of the bearing housings 22 from the engine block simplifies assembly and is itself the subject of copending Patent Application No. 8625171 filed in the United Kingdom on 21st Oct., 1986.

The crankshaft sub-assembly can be seen to comprise several parts which are free to rotate. In particular, the connecting rods 16 can move relative to the crankshaft 18, the pistons 14 can pivot relative to the connecting rods 16 and the bearing housings 22 can rotate about the crankshaft. A complicated robot would be needed to hold such an assembly in the position illustrated to enable the sub-assembly 10 to be introduced into the engine block 30. Furthermore, during this introduction, the piston rings would need to be compressed and while the engine block illustrated has been designed to facilitate access to the rings (by the separation from the engine block of the bearing housings 22 and of the skirt of the crank case) in other engines access to the rings is very limited.

During the course of mass production of engines, the crankshaft sub-assemblies are prepared off line and a stack of sub-assemblies are made available to the main engine production line ready for mounting in engine blocks. To facilitate the mounting of the sub-assemblies in the engine blocks, the sub-assemblies 10 are immersed in or sprayed with a liquid. The liquid is preferably water with added soluble oil and corrosion inhibitors. The coated sub-assemblies are now mounted in suitable jigs which hold their components as required and they are then stored in a freezer.

The liquid penetrates all the gaps between the component parts of the sub-assembly and on freezing locks the components together so that they remain in the required position even after removal from the jig.

The jig in which the sub-assembly is mounted will in this case compress the piston rings, correctly line up the connecting rods, the bearing housing and the crankshaft and will maintain the pistons on the centre lines of the cylinder bores 40.

After removal of the sub-assemblies 10 from the freezer, they are merely lowered into the engine blocks without any additional complication since the entire sub-assembly is now rigid and all its components are correctly aligned with the mating parts of the engine block. Furthermore, the clearance has been increased for the pistons since they are now at a lower temperature than the engine block.

Water and oil mixtures are used as lubricants during machining of most crankshaft parts and it is usual to smear the surface of a bearing with a lubricant during assembly. The required liquid coating on the relatively movable components of the sub-assembly may therefore in practice already be present on the surfaces and no separate coating step may be required. It can also be seen that the components are usually covered with a liquid during conventional assembly of an engine and no additional problem is created as regards corrosion or contamination by using the present invention.

It can be seen therefore that the invention considerably reduces the complexity of any automated machine required for the mounting of the crankshaft and also reduces the risk of damage being caused to components by a robot trying to assemble them by force when they are not correctly aligned.

I claim:

1. A method of assembling two parts of which one part is a sub-assembly formed of a plurality of relatively movable components, the method comprising the steps of holding the components of the sub-assembly in their desired relative positions for assembly, cooling the sub-assembly sufficiently to prevent relative movement between the components of the sub-assembly, and offering the sub-assembly to the other part while the components of the sub-assembly are locked against one another.

2. A method as claimed in claim 1, wherein prior to cooling, the sub-assembly is coated with a liquid and the sub-assembly is cooled at least sufficiently to freeze the liquid.

3. A method as claimed in claim 2, wherein the liquid is water containing soluble oils and corrosion inhibitors.

4. A method as claimed in any one of claims 1-3 wherein the sub-assembly includes an engine crankshaft, connecting rods, pistons and piston rings, and in which the piston rings are compressed into the piston grooves prior to the cooling the sub-assembly.

* * * * *